US011972706B2

(12) United States Patent
Gyoten

(10) Patent No.: US 11,972,706 B2
(45) Date of Patent: Apr. 30, 2024

(54) IMAGE DISPLAY SYSTEM AND IMAGE DISPLAY METHOD

(71) Applicant: Panasonic Intellectual Property Management Co., Ltd., Osaka (JP)

(72) Inventor: Takaaki Gyoten, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/960,275

(22) Filed: Oct. 5, 2022

(65) Prior Publication Data

US 2023/0026326 A1    Jan. 26, 2023

Related U.S. Application Data

(63) Continuation of application No. PCT/JP2021/019142, filed on May 20, 2021.

(30) Foreign Application Priority Data

May 29, 2020  (JP) ................................. 2020-094643

(51) Int. Cl.
G09G 3/00       (2006.01)
H04N 9/31       (2006.01)

(52) U.S. Cl.
CPC ........... *G09G 3/002* (2013.01); *H04N 9/3194* (2013.01); *G09G 2360/141* (2013.01); *G09G 2360/145* (2013.01); *G09G 2370/18* (2013.01)

(58) Field of Classification Search
None
See application file for complete search history.

(56) References Cited

U.S. PATENT DOCUMENTS

2015/0331304 A1* 11/2015 Okamoto ............... H05B 47/20
                                                        315/151
2016/0255313 A1*  9/2016 Samejima ............. H01S 5/0687
                                                         353/85

FOREIGN PATENT DOCUMENTS

JP      63-277951      11/1988
JP       2-304328      12/1990

(Continued)

OTHER PUBLICATIONS

International Search Report dated Jul. 13, 2021 in corresponding International Application No. PCT/JP2021/019142.

*Primary Examiner* — Stephen T. Reed
(74) *Attorney, Agent, or Firm* — Wenderoth, Lind & Ponack, L.L.P.

(57) ABSTRACT

An image display system includes semiconductor light sources that output optical signals including modulated signal portions at timings different from each other, optical fiber cables that respectively transmit the optical signals, a light synthesizer that synthesizes the optical signals to output a synthesized optical signal, a light amount detector that detects an output light amount of the synthesized optical signal, a modulated signal detector that detects the modulated signal portions from the detected output light amount, an image modulator that modulates the synthesized optical signal according to an input image signal to output a modulated image light, and a light source controller that outputs drive control signals for respectively outputting the optical signals respectively including the modulated signal portions according to the image signal, and detects a failure of the optical fiber cables based on whether a modulated signal portion among the plurality of modulated signal portions is detected.

9 Claims, 2 Drawing Sheets

(56) References Cited

FOREIGN PATENT DOCUMENTS

| | | |
|---|---|---|
| JP | 10-38751 | 2/1998 |
| JP | 2004-207420 | 7/2004 |
| JP | 2014-167610 | 9/2014 |
| JP | 2014-191926 | 10/2014 |
| JP | 2015-99768 | 5/2015 |
| JP | 2015-125834 | 7/2015 |

* cited by examiner

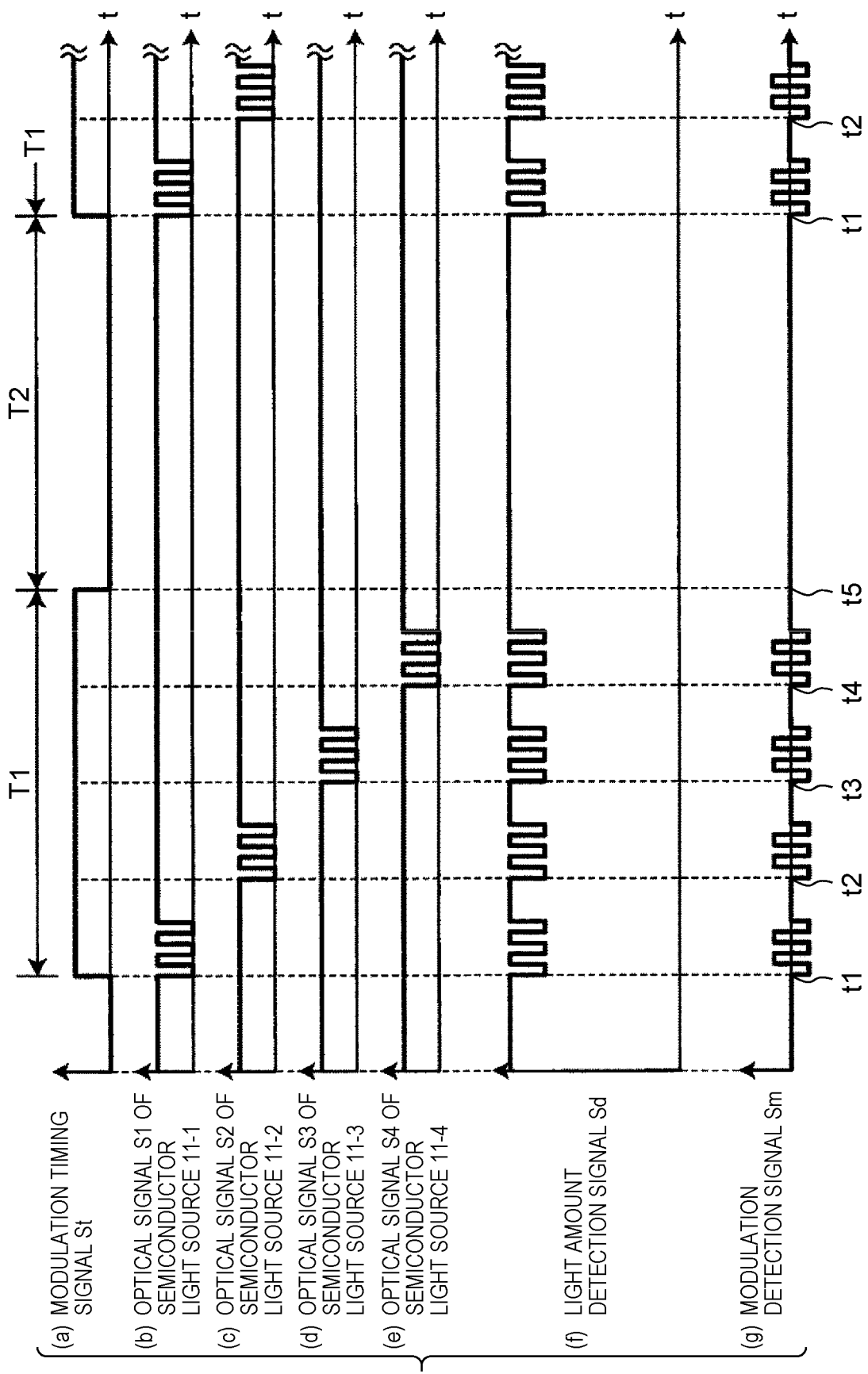

IMAGE DISPLAY SYSTEM AND IMAGE DISPLAY METHOD

BACKGROUND

1. Technical Field

The present disclosure relates to an image display system and an image display method in which a light source and an optical modulator are separately connected via an optical transmitter including a plurality of optical fiber cables and an image of an image signal is displayed.

2. Description of the Related Art

Patent Literature (PTL) 1 discloses a light source device that is used in, for example, a projector and can detect damage to an optical fiber cable without changing tone even during image projection. The light source device according to the related art includes a plurality of light sources, an optical fiber cable group, a driver that drives the plurality of light sources, a sensor that receives a part of light emitted from the optical fiber cable group and detects a light amount, and a determinator that acquires a signal corresponding to the light amount detected by the sensor.

Here, the driver supplies a drive current to the plurality of light sources, and superimposes a first pulse current and a second pulse current having an opposite polarity on the drive current at a predetermined timing for the light source that emits light of an inspection target color among the plurality of light sources. The determinator determines whether or not there is an abnormality in the optical fiber cable that propagates the light of the inspection target color based on a difference between a light amount of the light of the inspection target color detected by the sensor under a current amount of the drive current and a light amount of the light of the inspection target color detected under a current amount on which the first pulse current or the second pulse current is superimposed. As a result, it is possible to obtain a light source device capable of detecting the damage to the optical fiber cable without changing the tone even during the image projection.

PTL 1 is Unexamined Japanese Patent Publication No. 2014-191926.

SUMMARY

However, since an optical output of the light source on which the first pulse current is superimposed increases at a timing on which the first pulse current is superimposed, it is necessary to set the optical output at the timing on which the first pulse current is superimposed to be smaller than a maximum optical output that can be output by the light source, and it is necessary to set the optical output at a timing on which the first pulse current is not superimposed to be smaller than the maximum optical output that can be output by the light source. Therefore, there is a problem that the optical output of the light source device is reduced by introducing a mechanism for detecting the damage to the optical fiber cable.

The present disclosure provides an image display system and an image display method having a failure detection function of an optical fiber cable capable of detecting a failure of an optical fiber cable without reducing an optical output and without causing visible interference in an image to be displayed even during image projection.

Here, the failure or fault of the optical fiber cable refers to a failure state in which an optical signal cannot be transmitted due to damage or breakage of the optical fiber cable.

An image display system according to the present disclosure includes a plurality of semiconductor light sources that drive semiconductor light source elements to respectively output a plurality of optical signals respectively including a plurality of modulated signal portions at timings different from each other, a plurality of optical fiber cables that are respectively connected to the plurality of semiconductor light sources, and respectively transmit the plurality of optical signals, a light synthesizer that synthesizes the plurality of optical signals respectively output from the plurality of optical fiber cables, to output a synthesized optical signal, a light amount detector that detects an output light amount of the synthesized optical signal from the light synthesizer, a modulated signal detector that detects the plurality of modulated signal portions from the detected output light amount of the synthesized optical signal, an image modulator that modulates the synthesized optical signal from the light synthesizer according to an input image signal to output a modulated image light, and a light source controller that respectively outputs, to the plurality of semiconductor light sources, a plurality of drive control signals for respectively outputting the plurality of optical signals respectively including the plurality of modulated signal portions according to the image signal, and detects a failure of the plurality of optical fiber cables based on whether or not a modulated signal portion among the plurality of modulated signal portions is detected.

According to the image display system and the like of the present disclosure, it is possible to detect a failure of an optical fiber cable without reducing an optical output and without causing visible interference in an image to be displayed even during image projection.

BRIEF DESCRIPTION OF THE DRAWINGS

FIG. 2 is a timing chart of signal waveforms illustrating an operation example of the image display system in FIG. 1.

DETAILED DESCRIPTION

Figure 1:
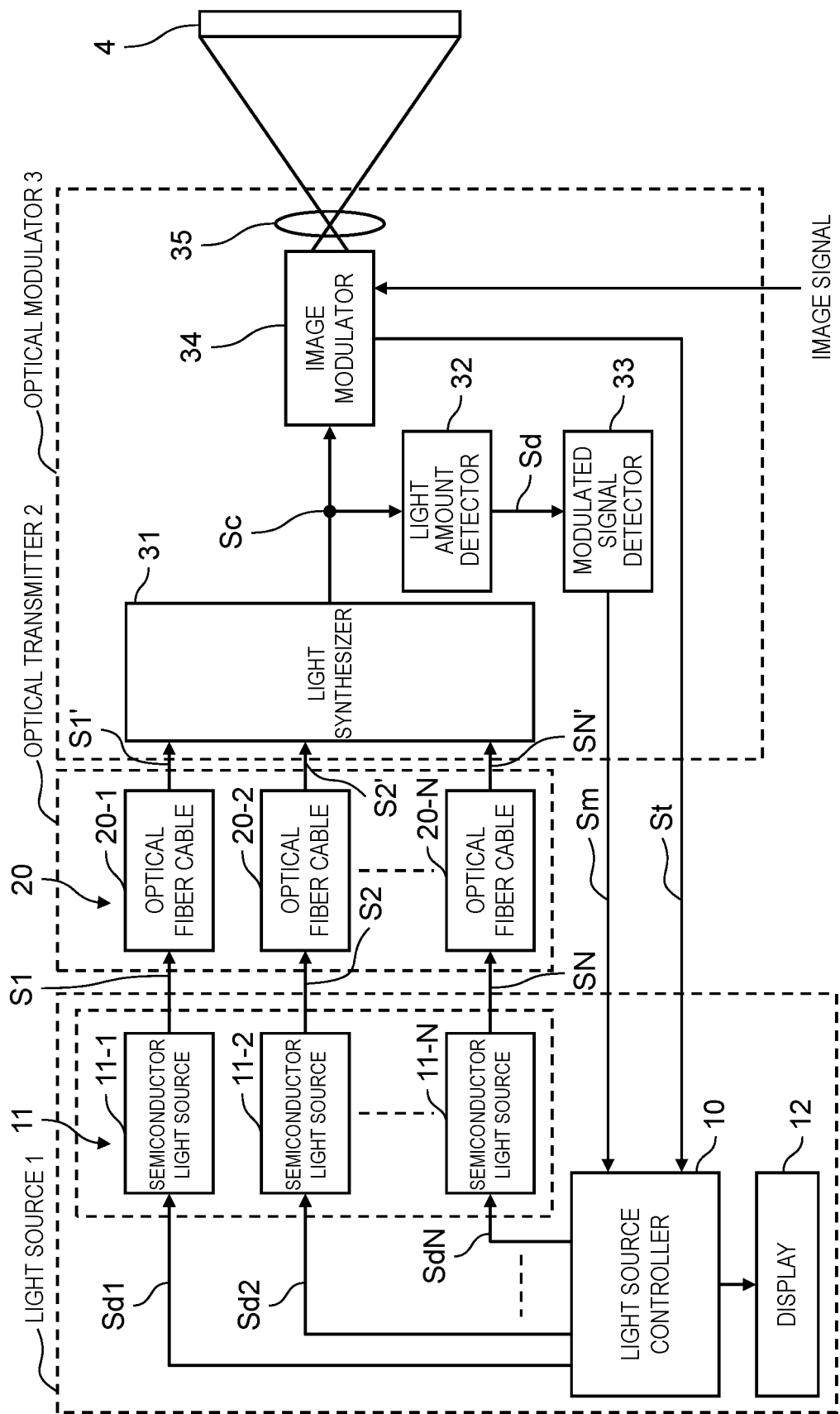
FIG. 1 is a block diagram illustrating a configuration example of an image display system according to an exemplary embodiment.

Hereinafter, exemplary embodiments of the present invention are described with reference to the drawings. Note that the same or similar components are denoted by the same reference marks.

Hereinafter, the exemplary embodiments will be described in detail with reference to the drawings as appropriate. However, unnecessarily detailed description may be omitted. For example, the detailed description of already well-known matters and the overlap description of substantially same configurations may be omitted. This is to avoid unnecessary redundancy in the following description and to facilitate understanding by those skilled in the art.

Note that the inventor provides the attached drawings and the description below to help those skilled in the art fully understand the present disclosure, and does not intend to limit the subject matter as recited in the claims to these.

FIRST EXEMPLARY EMBODIMENT

Hereinafter, a first exemplary embodiment will be described with reference to FIGS. 1 and 2.

[1-1. Configuration]

FIG. 1 is a block diagram illustrating an operation example of an image display system having a function of detecting a failure of an optical fiber cable according to the exemplary embodiment.

In FIG. 1, the image display system includes light source 1, optical transmitter 2, and optical modulator 3. Here, light source 1 and optical modulator 3 are separated by a predetermined distance and are connected via optical transmitter 2. Light source 1 includes a plurality of N semiconductor light sources 11-1 to 11-N (hereinafter, reference mark "11" is collectively attached), light source controller 10 that drives and controls semiconductor light sources 11, and display 12. Optical transmitter 2 includes a plurality of N optical fiber cables 20-1 to 20-N (hereinafter, reference mark "20" is collectively attached). For example, optical modulator 3 is a projection display apparatus such as a projector, and includes light synthesizer 31, light amount detector 32, modulated signal detector 33, image modulator 34, and projection lens 35.

The plurality of semiconductor light sources 11 drive and control a plurality of semiconductor light source elements by using a plurality of drive control signals Sd1 to SdN (including modulated signal portions sequentially generated at timings different from each other) from light source controller 10 to generate a plurality of optical signals S1 to SN, and outputs the plurality of optical signals to corresponding optical fiber cables 20-1 to 20-N, respectively. The plurality of optical fiber cables 20 are connected to the plurality of semiconductor light sources 11, respectively, transmit optical signals S1 to SN, and output the optical signals to light synthesizer 31 of optical modulator 3.

Light synthesizer 31 synthesizes a plurality of optical signals S1' to SN' output from the plurality of optical fiber cables 20 and outputs synthesized optical signal Sc to light amount detector 32 and image modulator 34. Light amount detector 32 detects an output light amount of synthesized optical signal Sc from light synthesizer 31, and outputs light amount detection signal Sd to modulated signal detector 33. Modulated signal detector 33 detects modulation detection signal Sm including a plurality of modulated signal portions from the output of light amount detector 32 by using, for example, a high-pass filter, and outputs modulation detection signal Sm to light source controller 10.

Image modulator 34 is, for example, a digital micromirror device (DMD), outputs, to light source controller 10, modulation timing signal St indicating time period T1 including timings at which the modulated signal portions are generated in optical signals S1 to SN of semiconductor light source 11 at timings different from each other (timings t1 to t4 in FIG. 2) based on an input image signal, and generates image light by intensity-modulating synthesized optical signal Sc from light synthesizer 31 according to the input image signal to project the image light onto screen 4 via projection lens 35.

Light source controller 10 sequentially generates the modulated signal portions at timings different from each other (timings t1 to t4 in FIG. 2) within an on period (time period T1 in FIG. 2) of modulation timing signal St, and outputs the modulated signal portions as drive control signals Sd1 to SdN to semiconductor light sources 11-1 to 11-N, respectively. Light source controller 10 also detects which optical fiber cable among the plurality of optical fiber cables 20 has a failure based on whether or not there is each modulated signal portion among the plurality of modulated signal portions included in modulation detection signal Sm. That is, when there is a failure in optical fiber cable 20, since the modulated signal portion is not included in optical signals S1' to SN' output from optical fiber cables 20, modulation does not occur in a corresponding portion of modulation detection signal Sm. Thus, light source controller 10 determines that there is a failure in optical fiber cable 20 corresponding to the modulated signal portion that is not detected by modulated signal detector 33 among the plurality of modulated signal portions included in modulation detection signal Sm, displays the determination result on display 12, and stops driving of semiconductor light source 11 connected to optical fiber cable 20 determined to have the failure when the determination is performed.

[1-2. Operation]

FIG. 2 is a timing chart of signal waveforms illustrating an operation example of the image display system in FIG. 1. An operation of the image display system having the above configuration will be described.

Although the operation example of FIG. 2 illustrates the case of N=4, the present disclosure is not limited thereto, and N may be plural other than 4. That is, the required number of N is set in accordance with the required number of optical fiber cables for optical output.

In FIG. 2, when the semiconductor light source element of semiconductor light source 11 performs control such that light source light is turned on or off by switching by using, for example, a plurality of subfields, image modulator 34 of optical modulator 3 outputs modulation timing signal St in time period T1 of the subfield used at the time of outputting a relatively large optical signal and controls a timing (time period) at which semiconductor light source 11 is modulated, and modulates semiconductor light source 11 in time period T1 of the subfield used at the time of outputting the relatively large optical signal. Note that, in time period T2 other than time period T1, the modulated signal portion is not transmitted. As a result, it is possible to constantly reduce a ratio of components of the modulated signal portion in the output of the optical signal, and it is possible to set modulated components difficult to be visually recognized.

As illustrated in FIG. 2, light source controller 10 causes the plurality of semiconductor light sources 11-1 to 11-4 to generate the modulated signal portion by temporally and sequentially switching between output maximum values of optical signals S1 to S4 without changing the output maximum values and performing constant periodic on and off modulation based on modulation timing signal St. Specifically, as illustrated in FIG. 2, optical signals S1 to S4 of semiconductor light sources 11-1 to 11-4 have modulated signal portions starting from timings t1 to t4, respectively.

Optical signals S1' to SN' output from the plurality of optical fiber cables 20 are synthesized by light synthesizer 31, and a light amount of synthesized optical signal Sc is detected by light amount detector 32. As illustrated in FIG. 2, since the output of the optical signal of semiconductor light source 11 that is not modulated is synthesized with the output of the optical signal of semiconductor light source 11 that is being modulated, light amount detection signal Sd of light amount detector 32 has four modulated signal portions starting from timings t1 to t4 in the case of four semiconductor light sources 11-1 to 11-4. As illustrated in FIG. 2, since the outputs of the optical signals of three semiconductor light sources 11 that are not modulated are synthesized with the output of the optical signal of one semiconductor light source 11 that is being modulated, light amount detection signal Sd has a modulated optical signal waveform in which a component of the modulated signal portion is superimposed on a relatively large DC component. When the number of semiconductor light sources 11 is N, a ratio between the component of the modulated signal portion and the DC component, and the component of the modulated signal portion/the DC component is about 1/N. When N increases, it is difficult to stably detect the component of the modulated signal portion. When the DC component is removed by performing, for example, high-pass filter processing, modulated signal detector 33 can obtain modulation detection signal Sm as illustrated in FIG. 2, and can accurately detect a component amount of the modulated signal portion.

Since light source controller 10 recognizes which semiconductor light source 11 among the plurality of semiconductor light sources 11 is being modulated, it is possible to grasp which optical fiber cable 20 among the plurality of optical fiber cables 20 has a failure by monitoring modulation detection signal Sm from modulated signal detector 33.

Image modulator 34 obtains an image of the image light on screen 4 by intensity-modulating synthesized optical signal Sc from light synthesizer 31 according to the input image signal and projecting the image light onto screen 4 via projection lens 35.

[1-3. Effects and the Like]

According to the exemplary embodiment having the above configuration, since the plurality of semiconductor light sources 11 performs the on and off modulation, an instantaneous maximum output value in optical signals S1 to SN of each of semiconductor light sources 11 can be set to a maximum output value of semiconductor light source 11 to be used. It is easy to shorten a time period in which optical signals S1 to SN are output within a detectable range. For example, when image modulator 34 operates at 60 Hz, it is also possible to set, for example, 1/100 of 166 μsec or the like with respect to 16.6 msec of a cycle. By taking such a consideration, it is possible to set the reduction in the optical output by using the optical signal having the modulated signal portion for fault detection to a very small value of 1% or less. When the number of the plurality of semiconductor light sources 11 to be used is relatively large, for example, the optical signal from one semiconductor light source 11 can be modulated at 16.6 msec, and a loss due to the fault of the optical fiber cable can be minimized.

The timing (time period) at which the modulation is performed is adjusted according to modulation timing signal St from image modulator 34, and thus, the output image is controlled such that the influence of the modulation on the image light output is not visually recognized. Accordingly, it is possible to monitor the failure such as damage or breakage of the plurality of optical fiber cables 20 while the image is displayed.

OTHER EXEMPLARY EMBODIMENTS

As described above, the first exemplary embodiment has been described as exemplification of the technique disclosed in the present application. However, the technique in the present disclosure is not limited to the exemplary embodiments and is applicable to exemplary embodiments appropriately subjected to changes, replacements, additions, omissions, and the like.

Thus, the following illustrates other exemplary embodiments as examples.

In the first exemplary embodiment having the above configuration, although the method of removing the DC component by using the high-pass filter has been described as an example of detection means of modulated signal detector 33, the present disclosure is not limited thereto, and the detection means of modulated signal detector 33 may be any means as long as the detection means separates the modulated signal portion from the DC component. Accordingly, the detection means of modulated signal detector 33 is not limited to the high-pass filter processing. When a band-pass filter of which a center frequency is a repetition frequency of modulation is used, it is possible to prevent erroneous detection due to high frequency noise in addition to a function of removing the DC component.

As described above, the exemplary embodiments have been described as examples of the technique according to the present disclosure. To this end, the accompanying drawings and detailed description are provided.

Accordingly, in order to illustrate the above technique, the components illustrated in the accompanying drawings or described in the detailed description can include not only components essential for solving the problems but also components non-essential for solving the problems. Thus, it should not be immediately construed that those non-essential components are essential only based on the fact that those non-essential components are illustrated in the accompanying drawings or described in the detailed description.

Since the above exemplary embodiments are for illustrating the techniques in the present disclosure, various modifications, replacements, additions, omissions, or the like can be made without departing from the scope of the accompanying claims or the equivalent thereof.

The present disclosure is applicable to an image display system and an image display method in which a light source and an optical modulator are separately connected via an optical transmitter including a plurality of optical fiber cables and an image of an image signal is displayed. Specifically, the present disclosure is applicable to, for example, a two-type projector.

What is claimed is:

1. An image display system comprising:
a plurality of semiconductor light sources that drive semiconductor light source elements to respectively output a plurality of optical signals respectively including a plurality of modulated signal portions at timings different from each other;
a plurality of optical fiber cables that are respectively connected to the plurality of semiconductor light sources, and respectively transmit the plurality of optical signals;
a light synthesizer that synthesizes the plurality of optical signals respectively output from the plurality of optical fiber cables, to output a synthesized optical signal;
a light amount detector that detects an output light amount of the synthesized optical signal from the light synthesizer;
a modulated signal detector that performs filter processing to remove a DC component of the detected output light amount from the output light amount of the synthesized optical signal and detects the plurality of modulated signal portions;
an image modulator that modulates the synthesized optical signal from the light synthesizer according to an input image signal to output a modulated image light; and
a light source controller that respectively outputs, to the plurality of semiconductor light sources, a plurality of drive control signals for respectively outputting the plurality of optical signals respectively including the plurality of modulated signal portions according to the image signal, and detects a failure of the plurality of optical fiber cables based on whether or not a modulated signal portion among the plurality of modulated signal portions is detected.

2. The image display system according to claim 1, wherein the light source controller determines that an optical fiber cable corresponding to the modulated signal portion that is not detected by the modulated signal detector among the plurality of modulated signal portions has a failure.

3. The image display system according to claim 2, wherein the light source controller stops driving of a semiconductor light source connected to the optical fiber cable determined to have the failure when it is determined that the optical fiber cable corresponding to the modulated signal portion that is not detected by the modulated signal detector has the failure.

4. The image display system according to claim 1, further comprising a projection lens that projects the image light from the image modulator on a screen.

5. The image display system according to claim 1, wherein the filter processing comprises a high-pass filter processing.

6. An image display method for an image display system that includes a plurality of semiconductor light sources that drive semiconductor light source elements to respectively output a plurality of optical signals respectively including a plurality of modulated signal portions at timings different from each other, a plurality of optical fiber cables that are respectively connected to the plurality of semiconductor light sources, and respectively transmit the plurality of optical signals, a light synthesizer that synthesizes the plurality of optical signals respectively output from the plurality of optical fiber cables, to output a synthesized optical signal, a light amount detector that detects an output light amount of the synthesized optical signal from the light synthesizer, a modulated signal detector that performs filter processing to remove a DC component of the detected output light amount from the output light amount of the synthesized optical signal and detects the plurality of modulated signal portions, and an image modulator that modulates the synthesized optical signal from the light synthesizer according to an input image signal to output a modulated image light, the image display method comprising:

respectively outputting, to the plurality of semiconductor light sources, a plurality of drive control signals for respectively outputting the plurality of optical signals respectively including the plurality of modulated signal portions according to the image signal; and detecting a failure of the plurality of optical fiber cables based on whether or not a modulated signal portion among the plurality of modulated signal portions is detected.

7. The image display method according to claim 6, wherein the detecting the failure includes determining that an optical fiber cable corresponding to the modulated signal portion that is not detected by the modulated signal detector among the plurality of modulated signal portions has a failure.

8. The image display method according to claim 7, wherein the detecting the failure includes stopping driving of a semiconductor light source connected to the optical fiber cable determined to have the failure when it is determined that the optical fiber cable corresponding to the modulated signal portion that is not detected by the modulated signal detector has the failure.

9. The image display method according to claim 6, wherein the filter processing comprises a high-pass filter processing.

* * * * *